AUTOMATIC TELEPHONE GUEST CALL SYSTEM
Filed Nov. 19, 1965
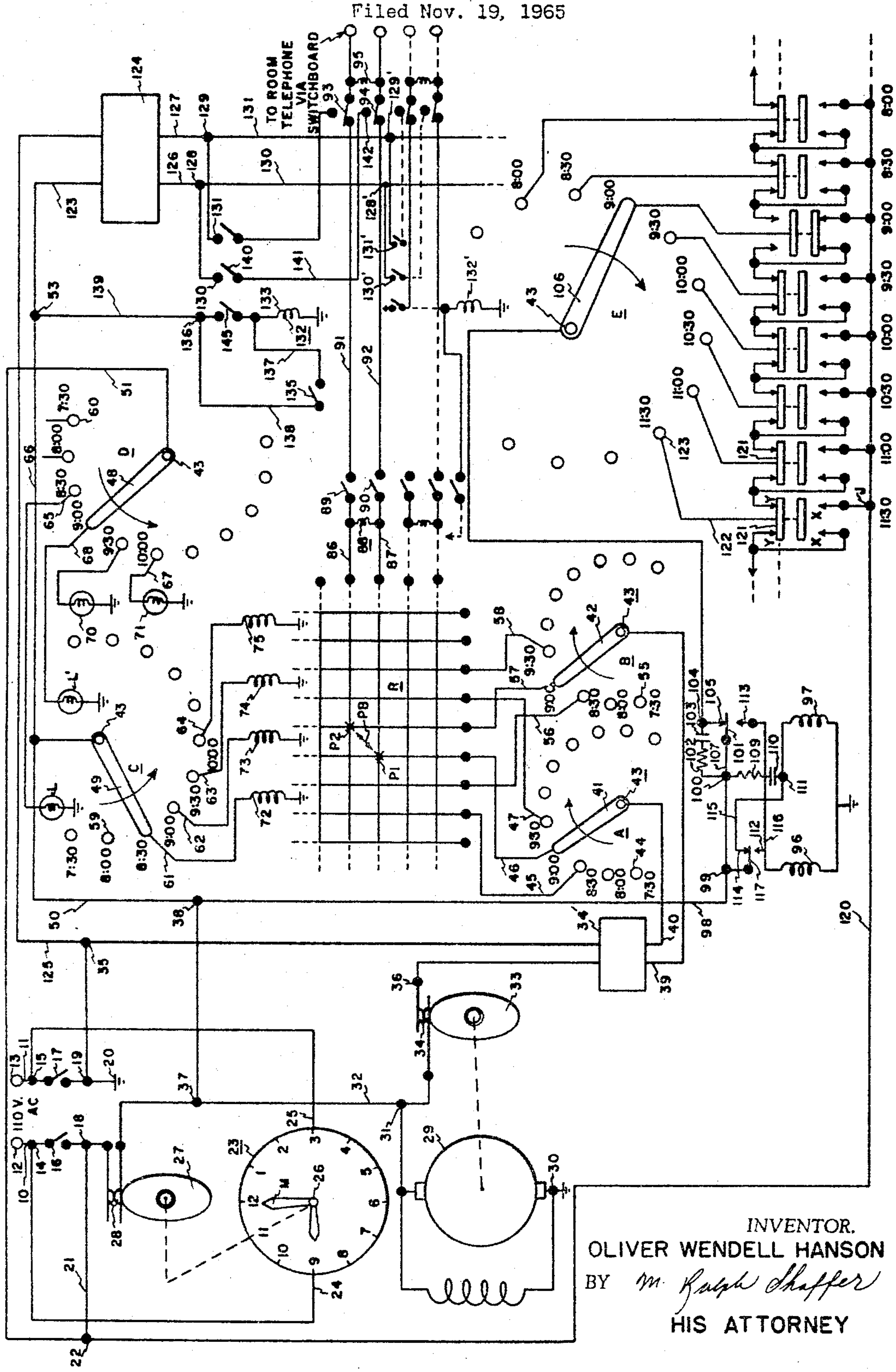
INVENTOR.
OLIVER WENDELL HANSON
BY M. Ralph Shaffer
HIS ATTORNEY 3,393,272
AUTOMATIC TELEPHONE GUEST CALL SYSTEM
Oliver Wendell Hanson, 63 W. 2000 S., Bountiful, Utah 84010
Filed Nov. 19, 1965, Ser. No. 508,666
7 Claims. (Cl. 179—2)

The present invention is related to guest call systems and, more particularly, to a new and improved guest call system, as hereinafter described, wherein calls to individual rooms of motels or hotels are made automatically as a reminder to guests that the times for specific time requests have arrived.

The automatic guest call system of the present invention is designed to provide an automatic means for calling, reminding, or awakening motel and hotel guests at any desired time of day or night, this with a minimum amount of preparation and attention by the desk clerk or telephone switchboard operators. Hotel and motel guests frequently request and expect call service. Such a service has normally been indicated free of charge by hotels and motels for many years. Recently this is accomplished by means of modern telephone systems installed in rooms and offices with the operator manually ringing the rooms at the desired times. The present invention, in contrast, offers a circuit which can be programmed by telephone operators, in a very direct and convenient manner, to call automatically the desired rooms at desired times.

The present guest call system is designed to serve in conjunction with existing telephone equipment and in no way interferes with normal operation of telephone switchboard systems. Upon receipt of a request for call, the desk clerk or telephone operator simply operates a pushbutton switch (or other type switch) corresponding to the room number and time requested. No further attention is required to place the call at the correct time, since the automatic system will provide a ringing or other signal on the room telephone at the correct time. An audio signal is provided in the telephone receiver following the ring which is isolated from other telephones in other rooms.

The system has sufficient versatility to permit any number of rooms to be called at a designated time and for any room or combination of rooms to be called numerous times throughout the day or night.

For a preferred embodiment a decision was made to provide calls to be made on the hour or on the half-hour or any other time schedule 30 minutes apart, thus giving a guest a choice of any number of times during the 24-hour period, 30 minutes apart. To provide ringing signals more often than 30 minutes apart would greatly increase equipment cost and would gain little in guest convenience. However, the present invention will contemplate, of course, any time spacing other than the 30 minutes herein provided for.

To provide ringing signals one hour apart substantially reduces equipment cost; however, this would not offer adequate convenience for the average guest. Hence, while other time intervals are possible, the 30-minute time interval has been selected here as the most appropriate and most satisfactory compromise.

Accordingly, a principal object of the present invention is to provide a new and improved guest call system for hotels and motels, for example.

A further object of the invention is to provide a variety of convenient features including isolation between rooms through the guest call system so that multi-room ringing will not occur during normal switchboard ringing to one room. This feature will be explained later in greater detail.

An additional object is to provide a guest call system wherein, by use of a convenient switching matrix, a telephone desk operator can easily select by a single switch both a particular room and the time the guest call is to reach the room.

An additional object is to provide a system which will take into consideration intermittent operation, if desired, so that the system can be kept in step with the correct time.

An additional object is to provide in a guest call system a means for automatically ringing rooms on a desired-period basis at selected times, and this in such a manner as not to interfere with incoming calls.

The features of the present invention which are believed to be novel are set forth with particularly in the appended claims. The present invention, both as to its organization and manner of operation, together with further objects and advantages thereof, may best be understood by reference to the following description, taken in connection with the accompanying drawings in which:

The sole figure represents a schematic diagram of a system contemplated in accordance with the features of the present invention. For convenience of illustration, corresponding leads, components, and room phones which duplicate the system illustrated are not shown. A typical setup to call one room at 9:00 is shown.

Input leads 10 and 11 are coupled between respective input terminals 12 and 13 and junctions 14 and 15 as shown. On-off, normally open power switches 16 and 17 may be ganged together and are respectively coupled between junctions 14 and 15 and junctions 18 and 19, respectively. Junction 19 is maintained at a ground or common reference potential as shown at 20. Lead 21 is coupled between junction 18 and junction 22 as shown. Electrically-driven clock/timer 23 includes conventional motor input leads 24 and 25 which are respectively connected to junctions 14 and 15. Thus, whether or not the system as a whole is turned on by the ganged power on-off switches 16–17, the clock or clock/timer 23, absent power failures, will indicate current time.

Ganged to or in conjunction with the rotatable minute shaft 26 of clock/timer 23 is a cam 27. This cam operates to close contacts 28 every half-cycle or 30 minutes. The cam 27 is preferably designed for one-minute closure at each 180° position. The minute hand M of the clock going from "12" around to "12" will thus cause a contact closure of contacts 28 for one minute at the first "12" position, for one minute at the 6- or 30-minute position, and then for one minute at the hour position, and so on. Also included in the circuit is an alternating current motor 29 which is maintained at a common reference potential at 30 and includes a power input junction terminal at 31. The latter is a junction in the lead or bus at 32.

Alternating current motor 29 drives a cam 33 which includes cam contacts 34. The motor 29 and cam 33 are designed and so geared together that cam 33 is preferably driven three revolutions per minute. Thus, there will be six openings of the contacts at 34 during each minute duration, with the cam preferably being designed so that when the contacts 34 are closed they will remain closed for five seconds and then, alternately, between closure positions, the contacts will remain open for five seconds. Thus, while the clock/timer minute hand M proceeds through one minute from 12 o'clock position to 12:01 clock position the motor 29 will drive cam 23 so that the contacts 34 are closed for five seconds, then opened for five seconds, then closed for five seconds, and so on, opening six times and closing six times during the one-minute traverse of minute hand M of clock 23.

In returning to the circuit it is seen that junctions 35 and 36 are respectively coupled to junction 19 and contacts 34 and lead to a 20-cycle-per-second ringing source 34' to supply power thereto. This source is designated as unit 34' and when energized produces a ring signal source. When power on-off switches 16–17 are closed, the circuit is energized by going directly to ground or common reference potential 20 and through closed contacts 34 and 28 via lead 32.

It is deemed preferable to discuss the operation of the circuit completely as thus far described. Clock/timer 23 is always running, by virtue of its drive motor being coupled by leads 24 and 25 to the input terminals 12 and 13. When the power, ganged switches 16, 17 are closed, then a ground is supplied ringing sourcve 34' and, provided contacts 28 and 23 are closed, the power input terminals 12 will be directly connected to the other side of ring source 34'. Ground is supplied to junction 35 only when the ganged power on-off switch is closed. Power is supplied the remaining terminal of ring source 34' when the cam closes contacts 28 at zero and at 30-minute periods for one-minute closure times. Hence, power will be supplied junctions 37 and 38 at these times.

During such times cam 33, in revolving, will close the contacts 34. Such will be only for five-second closures six times each minute. Thus, ring source 34' will be supplied for six, time-spaced power impressions during the one-minute period at the 12 position of the clock/timer and during the six or 30-minute position. Other ringing patterns are of course possible.

Continuing again the description of the circuit, it is seen that the output leads 39 and 40 of source 34' are coupled to arms 41 and 42 of stepping switch 43. Wafer A of the stepping switch includes plural contacts 44 each of which are supplied leads, three leads 45, 46, and 47 being shown for brevity and for clarity of illustration. These leads feed into a switching matrix R having push button switch PB. The matrix may take any one of several forms and may, for example, be made up in a manner where plural horizontal rows of switches will refer to the total number of rooms which may be called and plural vertical rows of switches represent the entrre number of times of call which each individual room, for example, may select. Thus, if there are 25 rooms involved in the operation, then there will be 25 vertically-spaced horizontal rows of actuatable switches. The switches in each horizontally-spaced vertical row corresponding to times which are selectable from the 25 rooms of the example. For a 30-minute-between-calls system, there will be 24 horizontally-spaced vertical rows of switches. Again, for the 25-room example, each vertical row will contain 25 switches. In the example shown in the drawing, a single two-pole switch has been used to connect the 9:00 leads to a telephone line pair (86, 87) of a particular room.

It is noted that power terminals 38 and 22, when hot, feed electrical energy to arms 48 and 49 via electrical leads 50 and 51 as shown. Electrical lead 21 is coupled to junction point 22. Lead 50 is directly connected to junction 53. Wafer B of the stepping switch 43 includes contacts 55 individual ones of which are provided with leads leading to the matrix R, and representative leads 56, 57, and 58 are shown.

Correspondingly, each of switch wafers C and D includes respective contact sets 59 and 60, and each is provided with a representative contact lead 61–64 and 65–68 as shown. Indicator lights are shown at 70 and 71 in the drawing. Push-button reset coils 72–75 are maintained at one terminal at a common reference potential and the opposite terminals are connected by respective lead 61–64 to the contacts 59 of wafer C.

In the position indicated it is seen that the selection of a particular push button for a particular room has selected particular points P–1 and P–2 for delivering ringing power to leads 86, 87 coupled across a ring relay coil 88. Relay 88 includes contacts 89 and 90 which automatically close when the ring relay winding 88' is energized. Leads 91 and 92 are connected directly through relay contacts 93 and 94 of slow-release relay 95 across the relay winding 95' of relay 95 to the associated room telephone via the conventional switchboard direct connection (not shown). Thus, the circuit is closed and the ringing source 34' is coupled through the ganged wafers of stepping switch 43 to the telephone of the room in which the person requesting the service is residing. It is noted that the matrix involves not only the selection of the room being serviced but also the time at which the ringing is to take place. In the circuit as thus far described it is seen that the ringing source is energized for five seconds for every other five-second period of the minute following "12" or zero position and 30-minute position (of the minute hand M of the clock-timer 23). Such ringing will be provided the room concerned only at those times preset on the switching matrix.

We now turn to a consideration of the auxiliary relay and stepping switch coil at 96 and 97 which actuates ganged stepping switch 43. It is seen that junction 38 is coupled by lead 98 to junctions 99, 100 and interrupter contact arm 101. Junction 100 is coupled through a resistance-capacitance circuit, comprising resistor 102 and series-connected capacitor 103, to junction 104, interrupter contact 105, and arm 106 of switch wafer E of the stepping switch 43. Lead 107 is coupled between junction 100 and arm 101. A resistance-capacitance circuit comprising resistor 109 and capacitor 110 is coupled between junctions 100 and 111. Auxiliary relay winding 96 is coupled between a common reference potential and contacts 112 and 113 as illustrated. Contact 114 is coupled by lead 115 to junction 111 and the upper side of stepping switch coil 97 of stepping switch 43. Lead 116 interconnects interrupter contact 112 and contact 113 with auxiliary relay coil 96.

The auxiliary relay and stepping switch coil circuitry operates as follows. When power is supplied junction 38, this power is directly coupled through junction 99, switch contact 114 and lead 115 to the stepping switch coil 97, to cause the stepping switch to step one position. The resistance-capacitance circuits of elements 102, 103, and 109, 110 are simply to preserve contact life due to current surges which would otherwise damage the contact points. When the stepping coil 97 is energized, interrupter contact arm 101 falls downwardly so as to supply current to auxiliary relay 96. This in turn draws its contact arm 117 downwardly so as to disconnect power from the stepping switch coil 97. Summing up, during the 60-second closure of the clock/timer cam 27 an alternating current signal is applied to the stepping switch coil 97. This in turn actuates the auxiliary relay 96 as hereinbefore described. These two coils and their respective contacts are so arranged that the stepping switch will advance only one position when receiving excitation from junction 37, and this regardless of the duration of the signal. Every time cam 27 closes contacts 28 for producing a new ring, the stepping switch will advance one step only. This functionally positions the stepping switch in synchronism with the clock/timer; cam 33, again, only has to do with the number of rings and duration of rings of the ringing source 34. (Switches 121 will be discussed shortly.)

It will be noted that the coils 96 and 17 with their contacts are so arranged that an alternating current signal from stepping switch wafer E will continuously drive a stepping switch until the alternating current signal is removed. The purpose of this function is to drive the stepping switch to a desired position in order to set up the wiper position to correct time. Additional information on this function will be given shortly.

We now turn to a description of the circuit. It is seen now that junction 22 is electrically taken by lead 120 to all the junctions associated with push buttons 121. When any of these push buttons are depressed, the respective contacts XX are shorted together. If the push buttons are not depressed, then the junctions YY are shorted together and connected to respective lead 122 leading to a respective contact 123 of stepping switch wafer E of stepping switch 43. It will be noted that each of the stepping switch contacts relate to a particular time; the manual depression of a particular switch will supply power therethrough and through the stepping switch wafer E to the stepping switch coil 97 only through contacts 101–105 and 114–117. This operation serves as a means to put the ganged stepping switch in synchronism with the clock/timer 23. Such is necessary when, for example, there are power interruptions or other malfunctions. In the example the 9 o'clock push button is depressed and the stepping switch has homed to "open" wiper position at 9 o'clock, thus stopping the stepping action. The wiper is assumed to have been on some position other than 9 o'clock before the reset action was initiated. Reset should be accomplished at any time other than the hour and half-hour when the clock/timer contact 28 is closed. If reset is performed during this ring period of one minute, then it is possible that momentary rings might occur on all telephones selected on the switching matrix for later rings as the stepping switch travels to a new position. Also, the switching matrix push buttons depressed for future calls will be electrically released (by means of arm 49 and release coils 72, 73, etc.) as the stepping switch travels to a new position, thus requiring a new ringing "set-up" on the switching matrix by the room clerk or telephone operator. This is a problem of inconvenience only and is not considered to be "normal" operation.

We shall now consider the circuit commencing at junction 53. Junction 53 is coupled by lead 123 to item 124 which may comprise a tape recorder with chimes, voice, or music, for example. Junction 35 on the input side of the circuit is coupled by lead 125 to the other side of unit 124. Leads 126 and 127 are output leads from unit 124 and connect to junctions 128 and 129. Leads 130 and 131 are common to junctions 128 and 129, respectively, and connect to corresponding junctions 128' and 129' leading to contacts 130' and 131', and so forth, of relay 132'. The coil 133 of relay 132 is maintained at a common reference potential at one point and on the opposite side thereof is coupled through contact 135 and back to junction 136 via leads 137 and 138 as indicated. Lead 139 intercouples junctions 136 and 53. Arm 140 is coupled by lead 141 to contact 142. Contact 135 is associated with and in fact is a relay contact of ring relay 88. Thus, it is seen that the energization of relay 88 produces a closing not only of contacts 89 and 90 but also of contacts 135.

The operation of this portion of the circuit is as follows. During the 60-second closure of cam-operated switch (28), there is energized a magnetic tape recorder capstan with a continuous loop of recorded tape, for example, which may constitute the unit 124; this is provided through a means such as an audio amplifier and an audio recorded signal consisting of a chime, voice, or music or combination of these. This audio signal is provided for the guest to hear in the telephone receiver when he answers the telephone ring. The audio signal appears on the audio output bus (130, 131) and is available to every telephone which is called by the system and subsequently answered.

In order to prevent the audio signal from appearing on all telephones every half hour, whether one is answering the ring or not, an alternating current relay 132 is energized by the ring relay (88) utilized for each respective room. Operation of the ring relay 88 by the system "closes in" the alternating current relay 132. This latter relay is held closed by its own contacts and provides a path for the audio signal to the two normally open contacts of the DC slow release relay 95. The relay 133 is "held in" until the contacts 28 associated with cam 27 opens so as to remove the lock-in voltage. It should be noted that the tape recorder at 124 turns off also at this time.

As to the direct current slow-release relay 95, it will be noted that when a room telephone is rung by the system, provisions must be made to stop the ring when the telephone is answered, this so that the guest will not receive a loud ringing noise in his ear from the receiver. A direct current relay actuated by a change in direct voltage level on the room telephone line (caused by lifting the telephone handset from the cradle) provides this necessary isolation. The average direct current level on the telephone line before lifting the handset is approximately 35 volts. After lifting the handset the level decreases to about 20 volts, as the low impedance handset draws current from the switchboard. This change in voltage causes the relay 95, for example, to actuate and open the circuit to the system ringing source. The relay de-activation also connects the telephone handset to the chime, voice, or music through the closed contacts of relay 132 previously discussed. It can be seen that relay 95 operates every time the telephone handset is lifted from the cradle, thus disconnecting the system. It is apparent that the audio signal (chimes, voice, or music) cannot be heard on the telephone unless preceded by a ring from the guest call system. Upon placing the handset back upon the cradle, the relay does not close back to its original condition until 60 seconds later. This slow-release feature prevents additional ringing while the contacts of cam 27 (contacts 28) are still closed.

It is also possible to obtain the desired action of relay 95 by placing the relay coil in series with the telephone line to the telephone, thus sensing current to the handset rather than voltage drop across the line. In some respects this method is preferabl but would require placing the relay coils between the motel switchboard and the telephones in order to obtain the current differential.

This invention is not to be understood as to being limited to one method or another, since the method actually used will depend upon the amount of integration allowed or preferred by the owners of the utilizing motel or hotel systems.

Conventional, manually-resettable push buttons, rotary switches, and so forth, may be used in the switching matrix disclosed to effect desired circuit closures at desired times, as previously described. If appropriate, wafer C and reset solenoids 72–75 may also be provided to accomplish switch reset automatically. Wafer C, it will be noted, provides *a* 110-volt AC signal from junction 38 to the push button electrical reset solenoids 72–75, sequentially. Referring to the schematic diagram, it can be seen that the wiper 49 associated with wafer C lags the wipers of the other wafers by one position. In the example shown, the wiper or arm 49 of wafer C is on the 8:30 position while the other wipers are on the 9:00 position. Assuming that the guest call system has just stepped to the 9:00 position and is providing a ring, wafer C is providing a signal to the release solenoid on the 8:30 position of the switching matrix to release all buttons for rooms which were called at 8:30. This feature assures that an erroneous duplicate call will not be made 12 hours later because the clerk forgot to manually reset or disconnect the rooms involved after the call.

A summary of the operation of the system is as follows:

(1) The motel clerk will close one or more matrix switches of switching matrix R as per guests' instructions.

(2) Stepping switch 42 is verified to be on the correct time segment (in accordance with the correct time or clock timer 23). If this clock has to be re-set, then the stepping switch 43 may be placed in step with the clock by the use of push buttons 121.

(3) On the hour or half-hour, contacts 22 will close for a period of one minute.

(a) Stepping switch 43 steps to next position.

(b) All matrix push buttons are released which were "called" 30 minutes previously (stepping switch wafer C, arm 49).

(c) The alternating motor 29 and cam 33 provide a ringing voltage, 5 seconds on and 5 seconds off alternately for one minute.

(d) One of the position indicator lights 70 will indicate that the stepping switch has stepped to a new position.

(e) Tape recorder turns "on." (See tape recorder device 124.)

(f) The ring voltage is applied, operates ring relay and relay 132.

(4) The guest will answer his telephone.

(a) Direct current slow-release relay 95 operates so as to disconnect the ring and simultaneously switches the chimes, voice, or music from unit 124 to the telephone.

(b) The guest replaces the handset—direct current relay 95 returns to normal one minute later.

(5) Timer contacts 28 open:

(a) Alternating current relay 132 drops out and returns to normal.

(b) Unit 124 turns off.

(c) The alternating current motor 29 and cam-operated switch contacts 34 open and ringing source all turn off.

(d) Entire guest call system de-energized for next 29 minutes except for switch position lights (L, L′, 70, 71, etc.). Time position push button circuit including push buttons 121 and clock/timer 23 likewise remain on.

(6) If clocktimer 23 and stepping switch 43 are not correct the operator will:

(a) Turn the alternating current power switch (16, 17) to "off" position and set clock.

(b) Turn alternating power switch power on and depress time correction push button (121) corresponding to the last half-hour or hour just past.

(c) The stepping switch 43 will now step to the correct time position.

(d) The push button depressed (121) is now manually released.

(e) If the clock is exactly on the hour or half-hour prior to correction, then wait two minuates and perform steps b, c, d (supra).

It is seen that the present invention provides a new and useful and direct approach to the problem of automatically placing guest calls to occupants of rooms in hotels, motels, offices, and so forth. The system is entirely automatic and foolproof and relieves the telephone operator from making notes, watching the clock, and otherwise manually performing this chore once call times have been programmed through the switching matrix.

The "white" terminals at the extreme right-hand side of the drawing shall be understood to represent "telephone stations," either directly or through the switchboard in use. "Telephone ringing" and similar phrases refer not only to audible signals but visual signals such as flashing lights, and so forth. Finally, it will be understood that for the complete system, all blank terminals will have corresponding leads and components as are shown by way of example in the drawings.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A guest call system including, in combination, manually settable, switching matrix means having plural output circuits corresponding to telephone stations to be serviced and plural input circuits corresponding to selectable times for guest-call activating the said telephone stations; telephone-ringing signal-source controlling means for supplying a signal to said telephone stations; means coupled to and between said signal-source means and said plural input circuits of said switching matrix for sequentially supplying said input circuits, in sequence, said signal at respective pre-determined times, said switching matrix including manually actuatable switch means for selectively coupling a chosen one of said input circuits with a selected member of said output circuits; a message generating unit; and means for automatically coupling said message generating unit to selected ones of said telephone stations when said stations are answered, and for automatically disconnecting said signal-generating means therefrom.

2. The guest call system of claim 1 wherein said signal-generating means includes means for providing sets of intermittent signals, the sets occurring at said pre-determined times.

3. The guest call system of claim 1 wherein said sequentially-supplying means comprises stepping switch means, said system also including timed means for stepping at periodic times said stepping switch means to a new position corresponding to the next one of said predetermined times.

4. Structure according to claim 1 wherein said guest call system includes actuatable means coupled to said sequentially supplying means for resetting said sequentially supplying means to correspond with correct time.

5. Structure according to claim 1 wherein said system includes plural means respectively interposed between said output circuits and corresponding ones of said telephone stations for intercoupling said switching matrix to said telephone stations solely when said output circuits corresponding thereto are energized.

6. Structure according to claim 1 wherein said system includes plural means respectively coupled between respective outputs of said switching matrix and respective ones of said telephone stations and respectively responsive to the electrical conditions of corresponding ones of said telephone stations for automatically relating said message means thereto.

7. Structure according to claim 1 wherein said system includes means for automatically resetting previously-selected portions of said switching matrix following said disconnecting of said signal-generating means from said selected ones of said telephone stations.

References Cited

UNITED STATES PATENTS

| | | |
|---|---|---|
| 584,173 | 6/1897 | Chance. |
| 2,856,461 | 10/1958 | Beilfuss. |
| 2,483,214 | 9/1949 | Lomax. |

ROBERT L. GRIFFIN, *Primary Examiner.*

J. T. STRATMAN, *Assistant Examiner.*